(12) United States Patent
Chen et al.

(10) Patent No.: US 8,294,647 B2
(45) Date of Patent: Oct. 23, 2012

(54) LCD PIXEL DESIGN VARYING BY COLOR

(75) Inventors: Cheng Chen, Cupertino, CA (US);
Ming Xu, Cupertino, CA (US); Mingxia Gu, Santa Clara, CA (US); Shih Chang Chang, Cupertino, CA (US); Shawn Robert Gettemy, San Jose, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 793 days.

(21) Appl. No.: 12/371,380

(22) Filed: Feb. 13, 2009

(65) Prior Publication Data

US 2010/0207858 A1 Aug. 19, 2010

(51) Int. Cl.
*G09G 3/36* (2006.01)

(52) U.S. Cl. ......................................................... 345/88
(58) Field of Classification Search ....................... 345/88
See application file for complete search history.

(56) References Cited

U.S. PATENT DOCUMENTS

| | | |
|---|---|---|
| 4,991,115 A | 2/1991 | Guthrie et al. |
| 5,396,351 A | 3/1995 | Gessel |
| 5,450,222 A | 9/1995 | Sirkin |
| 5,659,378 A | 8/1997 | Gessel |
| 6,157,426 A | 12/2000 | Gu |
| 6,285,431 B2 | 9/2001 | Lyu |
| 6,433,933 B1 | 8/2002 | Gettemy |
| 6,466,285 B1 | 10/2002 | Ichikawa |
| 6,466,290 B2 | 10/2002 | Kim |
| 6,536,933 B1 | 3/2003 | Gettemy et al. |
| 6,545,862 B1 | 4/2003 | Gettemy et al. |
| 6,603,469 B1 | 8/2003 | Gettemy et al. |
| 6,618,044 B1 | 9/2003 | Gettemy et al. |
| 6,642,985 B2 | 11/2003 | Kim |
| 6,685,328 B1 | 2/2004 | Hanson et al. |
| 6,700,560 B2 | 3/2004 | Sumiya |
| 6,710,754 B2 | 3/2004 | Hanson et al. |
| 6,718,115 B1 | 4/2004 | Gettemy et al. |
| 6,741,314 B2 | 5/2004 | Song |
| 6,859,244 B2 | 2/2005 | Kawase et al. |
| 6,888,532 B2 | 5/2005 | Wong et al. |

(Continued)

FOREIGN PATENT DOCUMENTS

JP 2001092382 4/2001

(Continued)

OTHER PUBLICATIONS

Jung, Byunghoo, et al.; "Improved Aperture Ratio Through Asymmetric Pixel Electrode Design"; Feb. 13, 1997.

(Continued)

*Primary Examiner* — Wayne Young
*Assistant Examiner* — Linh Hoffner
(74) *Attorney, Agent, or Firm* — Fletcher Yoder PC

(57) ABSTRACT

A liquid crystal display (LCD) having a plurality of pixels is provided. In one embodiment, the pixels of the LCD each include common and pixel electrodes formed on an insulating layer, and a liquid crystal layer responsive to electric fields generated by the electrodes. The plurality of pixels may include two or more sets of pixels each configured to transmit light of a different color, and the pixel electrodes of one set of pixels may be configured differently from those of another set. In other embodiments, the sizes of the pixels may differ. Various additional devices and methods are also provided.

27 Claims, 11 Drawing Sheets

U.S. PATENT DOCUMENTS

| | | |
|---|---|---|
| 6,919,681 B2 | 7/2005 | Cok |
| 6,924,752 B2 | 8/2005 | Gettemy et al. |
| 6,924,863 B2 | 8/2005 | Nishida |
| 6,947,017 B1 | 9/2005 | Gettemy |
| 6,965,375 B1 | 11/2005 | Gettemy et al. |
| 6,980,266 B2 * | 12/2005 | Choi .......................... 349/106 |
| 6,992,659 B2 | 1/2006 | Gettemy |
| 7,002,569 B1 | 2/2006 | Gettemy et al. |
| 7,006,080 B2 | 2/2006 | Gettemy |
| 7,034,802 B1 | 4/2006 | Gettemy et al. |
| 7,048,401 B2 | 5/2006 | Lee et al. |
| 7,057,579 B2 | 6/2006 | Hanson et al. |
| 7,057,698 B2 | 6/2006 | Chung |
| 7,068,256 B1 | 6/2006 | Gettemy et al. |
| 7,079,119 B2 | 7/2006 | Hanson et al. |
| 7,091,964 B2 | 8/2006 | Wong et al. |
| 7,095,387 B2 | 8/2006 | Lee et al. |
| 7,159,194 B2 | 1/2007 | Wong et al. |
| 7,167,309 B2 | 1/2007 | Saxena |
| 7,203,075 B2 | 4/2007 | Terada et al. |
| 7,248,271 B2 | 7/2007 | Credelle |
| 7,248,320 B2 | 7/2007 | Hirakata |
| 7,256,767 B2 | 8/2007 | Wong et al. |
| 7,268,775 B1 | 9/2007 | Gettemy |
| 7,304,707 B2 | 12/2007 | Son |
| 7,324,093 B1 | 1/2008 | Gettemy et al. |
| 7,339,639 B2 | 3/2008 | Nakano et al. |
| 7,342,571 B2 | 3/2008 | Fraser et al. |
| 7,348,964 B1 | 3/2008 | Gettemy et al. |
| 7,349,052 B2 | 3/2008 | Wu et al. |
| 7,362,338 B1 | 4/2008 | Gettemy et al. |
| 7,379,143 B2 | 5/2008 | Lyu |
| 7,466,373 B2 | 12/2008 | Xu et al. |
| 7,483,016 B1 | 1/2009 | Gettemy et al. |
| 2002/0154257 A1 * | 10/2002 | Iijima ............................ 349/67 |
| 2003/0098857 A1 | 5/2003 | Gettemy et al. |
| 2003/0160755 A1 | 8/2003 | Gettemy et al. |
| 2004/0046739 A1 | 3/2004 | Gettemy |
| 2004/0085503 A1 | 5/2004 | Kim |
| 2005/0139837 A1 | 6/2005 | Lee |
| 2005/0184974 A1 | 8/2005 | Gettemy et al. |
| 2005/0212999 A1 | 9/2005 | Yang |
| 2005/0269580 A1 | 12/2005 | D'Angelo |
| 2006/0018175 A1 | 1/2006 | Liljedahl |
| 2006/0066805 A1 | 3/2006 | Grunnet-Jepsen |
| 2006/0197740 A1 | 9/2006 | Xu et al. |
| 2006/0203169 A1 | 9/2006 | Ozawa |
| 2006/0214895 A1 * | 9/2006 | Shih et al. ...................... 345/88 |
| 2006/0232553 A1 | 10/2006 | Wong et al. |
| 2006/0256264 A1 | 11/2006 | Yang |
| 2006/0268560 A1 | 11/2006 | Wong et al. |
| 2006/0279557 A1 | 12/2006 | Gettemy |
| 2006/0284895 A1 | 12/2006 | Marcu et al. |
| 2007/0024583 A1 | 2/2007 | Gettemy et al. |
| 2007/0052617 A1 | 3/2007 | Hanson et al. |
| 2007/0069975 A1 | 3/2007 | Gettemy et al. |
| 2007/0070272 A1 | 3/2007 | Gettemy et al. |
| 2007/0070282 A1 | 3/2007 | Shibahara et al. |
| 2007/0115417 A1 | 5/2007 | Ge |
| 2007/0139586 A1 | 6/2007 | Gu et al. |
| 2007/0152963 A1 | 7/2007 | Wong et al. |
| 2007/0222927 A1 | 9/2007 | Uehara |
| 2007/0229475 A1 | 10/2007 | Gettemy et al. |
| 2007/0229749 A1 | 10/2007 | Kaneko |
| 2007/0273714 A1 | 11/2007 | Hodge et al. |
| 2007/0290989 A1 | 12/2007 | Gettemy et al. |
| 2007/0296693 A1 | 12/2007 | Wong et al. |
| 2008/0032755 A1 | 2/2008 | Fraser et al. |
| 2008/0036948 A1 | 2/2008 | Zhong et al. |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0068549 A1 | 3/2008 | Liao |
| 2008/0074400 A1 | 3/2008 | Gettemy et al. |
| 2008/0083569 A1 | 4/2008 | Gettemy et al. |
| 2008/0117184 A1 | 5/2008 | Gettemy |
| 2008/0121898 A1 | 5/2008 | Yin et al. |
| 2008/0137018 A1 | 6/2008 | Lin |
| 2008/0143946 A1 | 6/2008 | Wang |
| 2008/0164056 A1 | 7/2008 | Gettemy et al. |
| 2008/0180801 A1 | 7/2008 | Kobayashi |
| 2008/0186440 A1 | 8/2008 | Lim |
| 2008/0204431 A1 | 8/2008 | Chung et al. |
| 2008/0225217 A1 | 9/2008 | Wakabayashi |
| 2008/0231959 A1 | 9/2008 | Grip |
| 2008/0238813 A1 | 10/2008 | Gettemy et al. |
| 2008/0246726 A1 | 10/2008 | Gettemy |
| 2008/0259254 A1 | 10/2008 | Kikuchi |
| 2008/0303998 A1 | 12/2008 | Ohta |
| 2008/0309627 A1 | 12/2008 | Hotelling et al. |
| 2008/0309633 A1 | 12/2008 | Hotelling et al. |
| 2009/0009442 A1 | 1/2009 | Galbraith, Jr. et al. |

FOREIGN PATENT DOCUMENTS

| | | |
|---|---|---|
| KR | 2004061426 | 7/2004 |
| WO | WO 2008077261 | 7/2008 |

OTHER PUBLICATIONS

U.S. Appl. No. 12/371,284, filed Feb. 13, 2009, Chang et al.
U.S. Appl. No. 12/371,316, filed Feb. 13, 2009, Chen et al.
U.S. Appl. No. 12/371,342, filed Feb. 13, 2009, Chen et al.
U.S. Appl. No. 12/371,360, filed Feb. 13, 2009, Gu et al.
U.S. Appl. No. 12/371,364, filed Feb. 13, 2009, Chen et al.
U.S. Appl. No. 12/371,368, filed Feb. 13, 2009, Chen et al.
U.S. Appl. No. 12/371,409, filed Feb. 13, 2009, Xu et al.
U.S. Appl. No. 12/371,452, filed Feb. 13, 2009, Chang et al.
U.S. Appl. No. 12/415,848, filed Mar. 31, 2009, Chen et al.
U.S. Appl. No. 12/236,066, filed Sep. 23, 2008, Gettemy et al.

* cited by examiner

LCD PIXEL DESIGN VARYING BY COLOR

BACKGROUND

1. Field of the Invention

This relates generally to electronic display panels, such as liquid crystal displays.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Liquid crystal displays (LCDs) are commonly used as screens or displays for a wide variety of electronic devices, including such consumer electronics as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery-powered devices or in other contexts where it is desirable to minimize power usage.

The performance of an LCD may be measured with respect to a variety of factors. For example, some characteristics of interest with respect to an LCD panel may include transmittance and color accuracy. Typically, an LCD panel includes a number of pixels having colors that differ from one another, such as red pixels, green pixels, and blue pixels. Each of these pixels generally includes identical liquid crystal layers, driving circuitry, and the like. Due to the different wavelengths of light associated with the various colors, however, the different-colored pixels often exhibit transmittance-voltage responses that vary with respect to one another, which may generally reduce color accuracy. Further, such variations may require different voltages to be applied to each color of pixel to achieve peak transmittance.

SUMMARY

Certain aspects of embodiments disclosed herein by way of example are summarized below. It should be understood that these aspects are presented merely to provide the reader with a brief summary of certain forms an invention disclosed and/or claimed herein might take, and that these aspects are not intended to limit the scope of any invention disclosed and/or claimed herein. Indeed, any invention disclosed and/or claimed herein may encompass a variety of aspects that may not be set forth below.

The present disclosure generally relates to increasing the transmittance and color accuracy of electronic display pixels and panels. In accordance with the present disclosure, a display panel may include pixels of different colors that are configured different than one another based on their respective colors. In some embodiments, the pixels may be configured such that the transmittance-voltage response is the same for pixels of two or more colors. The structural differences between the pixels of different colors may include one or more of electrode size or shape, pixel size, or the like. Moreover, in at least some embodiments, reducing or eliminating the differences in transmittance-voltage response across pixels of different colors may increase the color accuracy of an LCD including such pixels.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present invention without limitation to the claimed subject matter.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment.

The present application is generally directed to increasing transmittance and color accuracy of an LCD panel. In some embodiments, pixels of different colors are varied with respect to one another, which may, in further embodiments, more closely align the transmittance-voltage response characteristics of the pixels in an LCD panel. For example, in various embodiments the electrodes of the pixels are configured different than one another based on the colors of the pixels. The electrodes may include finger-like extensions separated from each other by slits in the electrodes. The dimensions of these extensions and slits, as well as their contour and even their numbers, may be varied based on the colors of the pixels. Additionally, the dimensions and shapes of the entire electrodes and the pixels themselves may also be varied. By varying the physical characteristics of the pixels and its components, the transmittance-voltage response of pixels of various colors may be more closely harmonized, allowing for improved transmittance of the different pixels at a single driving voltage and enhanced color reproduction accuracy.

Figure 1:
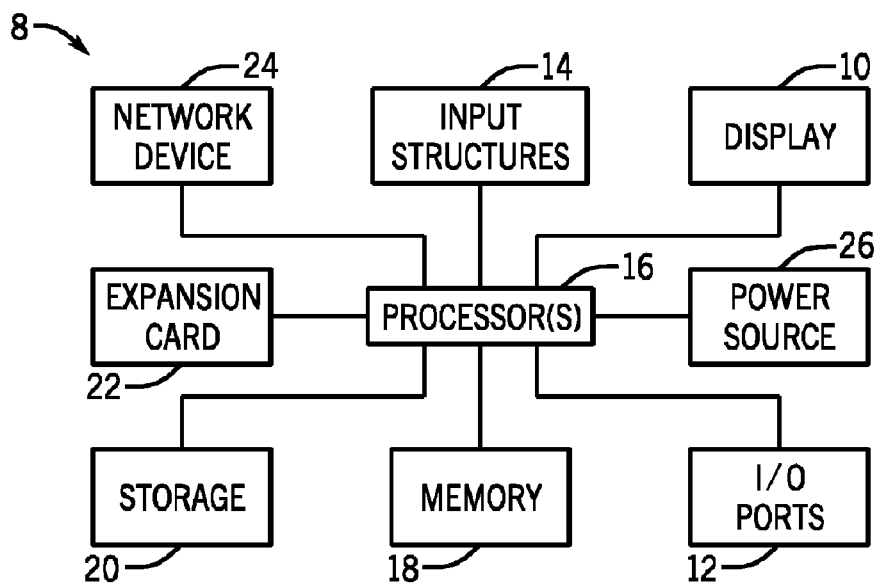
FIG. 1 is a block diagram of exemplary components of an electronic device, in accordance with aspects of the present disclosure.
Figure 3:
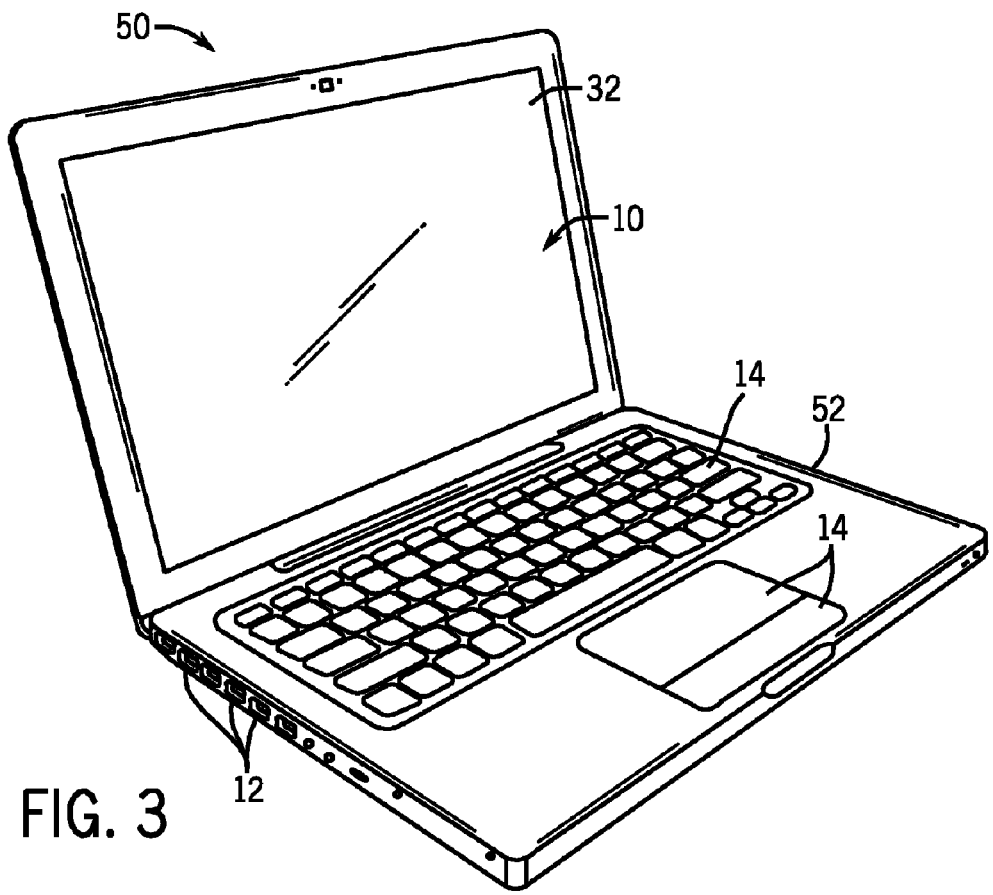
FIG. 3 is a view of a computer in accordance with aspects of the present disclosure.
Figure 2:
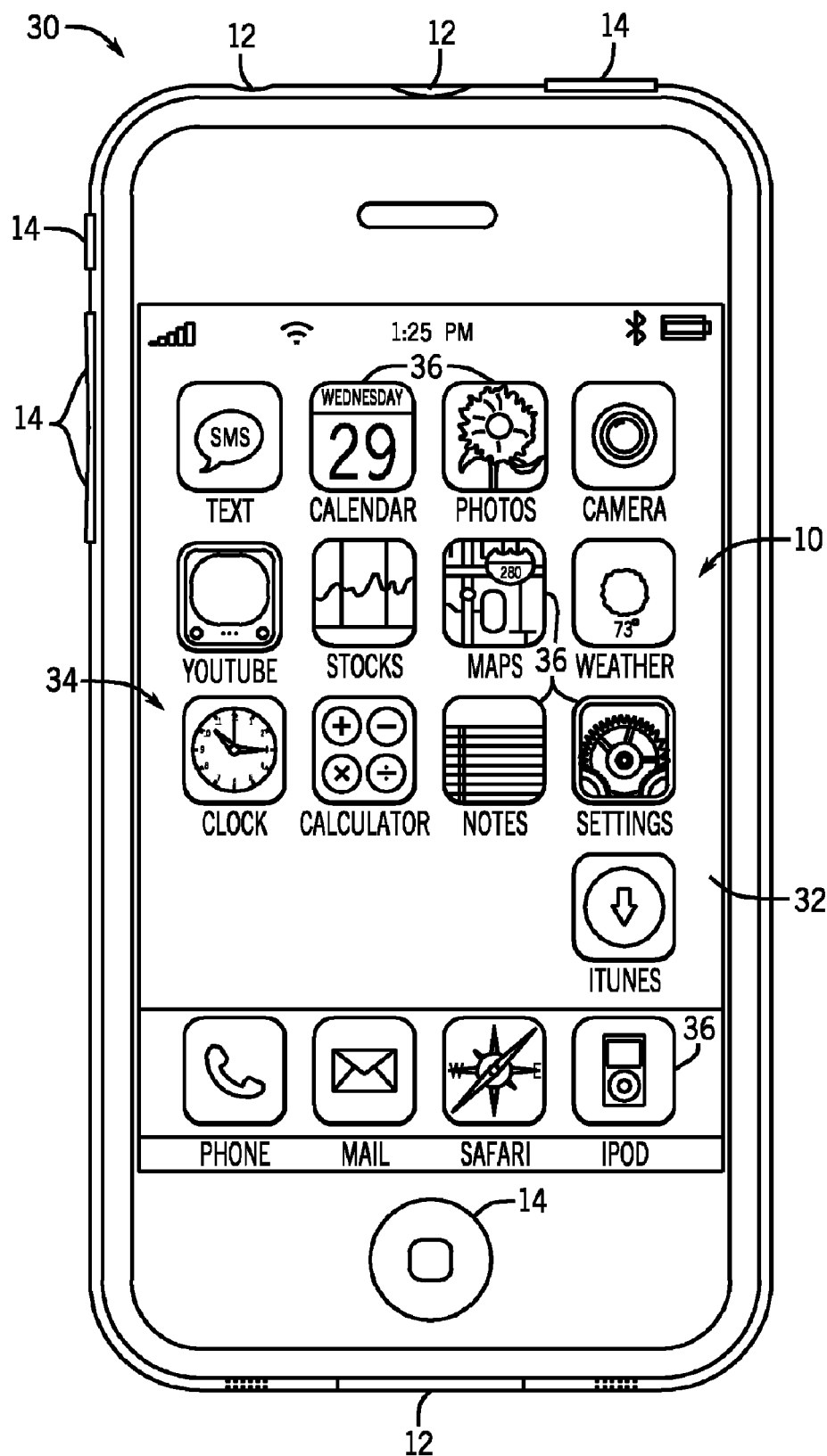
FIG. 2 is a front view of a handheld electronic device in accordance with aspects of the present disclosure.

With these foregoing features in mind, a general description of suitable electronic devices using such LCD displays is provided below. In FIG. 1, a block diagram depicting various components that may be present in electronic devices suitable for use with the present techniques is provided. In FIG. 2, one example of a suitable electronic device, here provided as a handheld electronic device, is depicted. In FIG. 3, another example of a suitable electronic device, here provided as a computer system, is depicted. These types of electronic devices, and other electronic devices providing comparable display capabilities, may be used in conjunction with the present techniques.

An example of a suitable electronic device may include various internal and/or external components that contribute to the function of the device. FIG. 1 is a block diagram illustrating the components that may be present in such an electronic device 8 and which may allow the device 8 to function in accordance with the techniques discussed herein. Those of ordinary skill in the art will appreciate that the various functional blocks shown in FIG. 1 may comprise hardware elements (including circuitry), software elements (including computer code stored on a computer-readable medium) or a combination of both hardware and software elements. It should further be noted that FIG. 1 is merely one example of a particular implementation and is merely intended to illustrate the types of components that may be present in a device 8. For example, in the presently illustrated embodiment, these components may include a display 10, I/O ports 12, input structures 14, one or more processors 16, a memory device 18, a non-volatile storage 20, expansion card(s) 22, a networking device 24, and a power source 26.

With regard to each of these components, the display 10 may be used to display various images generated by the device 8. In one embodiment, the display 10 may be a liquid crystal display (LCD). For example, the display 10 may be an LCD employing fringe field switching (FFS), in-plane switching (IPS), or other techniques useful in operating such LCD devices. Additionally, in certain embodiments of the electronic device 8, the display 10 may be provided in conjunction with a touch-sensitive element, such as a touchscreen, that may be used as part of the control interface for the device 8.

The I/O ports 12 may include ports configured to connect to a variety of external devices, such as a power source, headset or headphones, or other electronic devices (such as handheld devices and/or computers, printers, projectors, external displays, modems, docking stations, and so forth). The I/O ports 12 may support any interface type, such as a universal serial bus (USB) port, a video port, a serial connection port, an IEEE-1394 port, an Ethernet or modem port, and/or an AC/DC power connection port.

The input structures 14 may include the various devices, circuitry, and pathways by which user input or feedback is provided to the processor 16. Such input structures 14 may be configured to control a function of the device 8, applications running on the device 8, and/or any interfaces or devices connected to or used by the electronic device 8. For example, the input structures 14 may allow a user to navigate a displayed user interface or application interface. Examples of the input structures 14 may include buttons, sliders, switches, control pads, keys, knobs, scroll wheels, keyboards, mice, touchpads, and so forth.

In certain embodiments, an input structure 14 and display 10 may be provided together, such an in the case of a touchscreen where a touch sensitive mechanism is provided in conjunction with the display 10. In such embodiments, the user may select or interact with displayed interface elements via the touch sensitive mechanism. In this way, the displayed interface may provide interactive functionality, allowing a user to navigate the displayed interface by touching the display 10.

User interaction with the input structures 14, such as to interact with a user or application interface displayed on the display 10, may generate electrical signals indicative of the user input. These input signals may be routed via suitable pathways, such as an input hub or bus, to the processor(s) 16 for further processing.

The processor(s) 16 may provide the processing capability to execute the operating system, programs, user and application interfaces, and any other functions of the electronic device 8. The processor(s) 16 may include one or more microprocessors, such as one or more "general-purpose" microprocessors, one or more special-purpose microprocessors and/or ASICS, or some combination of such processing components. For example, the processor 16 may include one or more reduced instruction set (RISC) processors, as well as graphics processors, video processors, audio processors and/or related chip sets.

The instructions or data to be processed by the processor(s) 16 may be stored in a computer-readable medium, such as a memory 18. Such a memory 18 may be provided as a volatile memory, such as random access memory (RAM), and/or as a non-volatile memory, such as read-only memory (ROM). The memory 18 may store a variety of information and may be used for various purposes. For example, the memory 18 may store firmware for the electronic device 8 (such as a basic input/output instruction or operating system instructions), various programs, applications, or routines executed on the electronic device 8, user interface functions, processor functions, and so forth. In addition, the memory 18 may be used for buffering or caching during operation of the electronic device 8.

The components may further include other forms of computer-readable media, such as a non-volatile storage 20, for persistent storage of data and/or instructions. The non-volatile storage 20 may include flash memory, a hard drive, or any other optical, magnetic, and/or solid-state storage media. The non-volatile storage 20 may be used to store firmware, data files, software, wireless connection information, and any other suitable data.

The embodiment illustrated in FIG. 1 may also include one or more card or expansion slots. The card slots may be configured to receive an expansion card 22 that may be used to add functionality, such as additional memory, I/O functionality, or networking capability, to the electronic device 8. Such an expansion card 22 may connect to the device through any type of suitable connector, and may be accessed internally or external to the housing of the electronic device 8. For example, in one embodiment, the expansion card 22 may be a flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard or any other suitable wireless networking standard. The network device 24 may allow the electronic device 8 to communicate over a network, such as a Local Area Network (LAN), Wide Area Network (WAN), or the Internet. Further, the electronic device 8 may connect to and send or receive data with any device on the network, such as portable electronic devices, personal computers, printers, and so forth. Alternatively, in some embodiments, the electronic device 8 may not include a network device 24. In such an embodiment, a NIC may be added as an expansion card 22 to provide similar networking capability as described above.

Further, the components may also include a power source 26. In one embodiment, the power source 26 may be one or more batteries, such as a lithium-ion polymer battery or other type of suitable battery. The battery may be user-removable or may be secured within the housing of the electronic device 8, and may be rechargeable. Additionally, the power source 26 may include AC power, such as provided by an electrical outlet, and the electronic device 8 may be connected to the power source 26 via a power adapter. This power adapter may also be used to recharge one or more batteries if present.

With the foregoing in mind, FIG. 2 illustrates an electronic device 8 in the form of a handheld device 30, here a cellular telephone. It should be noted that while the depicted handheld device 30 is provided in the context of a cellular telephone, other types of handheld devices (such as media players for playing music and/or video, personal data organizers, handheld game platforms, and/or combinations of such devices) may also be suitably provided as the electronic device 8.

Further, a suitable handheld device 30 may incorporate the functionality of one or more types of devices, such as a media player, a cellular phone, a gaming platform, a personal data organizer, and so forth.

For example, in the depicted embodiment, the handheld device 30 is in the form of a cellular telephone that may provide various additional functionalities (such as the ability to take pictures, record audio and/or video, listen to music, play games, and so forth). As discussed with respect to the general electronic device of FIG. 1, the handheld device 30 may allow a user to connect to and communicate through the Internet or through other networks, such as local or wide area networks. The handheld electronic device 30, may also communicate with other devices using short-range connections, such as Bluetooth and near field communication. By way of example, the handheld device 30 may be a model of an iPod® or iPhone® available from Apple Inc. of Cupertino, Calif.

In the depicted embodiment, the handheld device 30 includes an enclosure or body that protects the interior components from physical damage and shields them from electromagnetic interference. The enclosure may be formed from any suitable material such as plastic, metal or a composite material and may allow certain frequencies of electromagnetic radiation to pass through to wireless communication circuitry within the handheld device 30 to facilitate wireless communication.

In the depicted embodiment, the enclosure includes user input structures 14 through which a user may interface with the device. Each user input structure 14 may be configured to help control a device function when actuated. For example, in a cellular telephone implementation, one or more of the input structures 14 may be configured to invoke a "home" screen or menu to be displayed, to toggle between a sleep and a wake mode, to silence a ringer for a cell phone application, to increase or decrease a volume output, and so forth.

In the depicted embodiment, the handheld device 30 includes a display 10 in the form of an LCD 32. The LCD 32 may be used to display a graphical user interface (GUI) 34 that allows a user to interact with the handheld device 30. The GUI 34 may include various layers, windows, screens, templates, or other graphical elements that may be displayed in all, or a portion, of the LCD 32. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touchscreen included in the display 10, or may be selected by a user input structure 14, such as a wheel or button.

The handheld electronic device 30 also may include various input and output (I/O) ports 12 that allow connection of the handheld device 30 to external devices. For example, one I/O port 12 may be a port that allows the transmission and reception of data or commands between the handheld electronic device 30 and another electronic device, such as a computer. Such an I/O port 12 may be a proprietary port from Apple Inc. or may be an open standard I/O port.

In addition to handheld devices 30, such as the depicted cellular telephone of FIG. 2, an electronic device 8 may also take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 8 in the form of a computer may be a model of a MacBook®, MacBook® Pro, MacBook Air®, iMac®, Mac® mini, or Mac Pro® available from Apple Inc. By way of example, an electronic device 8 in the form of a laptop computer 50 is illustrated in FIG. 3 in accordance with one embodiment of the present invention. The depicted computer 50 includes a housing 52, a display 10 (such as the depicted LCD 32), input structures 14, and input/output ports 12.

In one embodiment, the input structures 14 (such as a keyboard and/or touchpad) may be used to interact with the computer 50, such as to start, control, or operate a GUI or applications running on the computer 50. For example, a keyboard and/or touchpad may allow a user to navigate a user interface or application interface displayed on the LCD 32.

As depicted, the electronic device 8 in the form of computer 50 may also include various input and output ports 12 to allow connection of additional devices. For example, the computer 50 may include an I/O port 12, such as a USB port or other port, suitable for connecting to another electronic device, a projector, a supplemental display, and so forth. In addition, the computer 50 may include network connectivity, memory, and storage capabilities, as described with respect to FIG. 1. As a result, the computer 50 may store and execute a GUI and other applications.

With the foregoing discussion in mind, it may be appreciated that an electronic device 8 in the form of either a handheld device 30 or a computer 50 may be provided with an LCD 32 as the display 10. Such an LCD 32 may be utilized to display the respective operating system and application interfaces running on the electronic device 8 and/or to display data, images, or other visual outputs associated with an operation of the electronic device 8.

In embodiments in which the electronic device 8 includes an LCD 32, the LCD 32 may include an array or matrix of picture elements (i.e., pixels). In operation, the LCD 32 generally operates to modulate the transmission of light through the pixels by controlling the orientation of liquid crystal disposed at each pixel. In general, the orientation of the liquid crystals is controlled by a varying an electric field associated with each respective pixel, with the liquid crystals being oriented at any given instant by the properties (strength, shape, and so forth) of the electric field.

Different types of LCDs may employ different techniques in manipulating these electrical fields and/or the liquid crystals. For example, certain LCDs employ transverse electric field modes in which the liquid crystals are oriented by applying an in-plane electrical field to a layer of the liquid crystals. Example of such techniques include in-plane switching (IPS) and fringe field switching (FFS) techniques, which differ in the electrode arrangement employed to generate the respective electrical fields.

While control of the orientation of the liquid crystals in such displays may be sufficient to modulate the amount of light emitted by a pixel, color filters may also be associated with the pixels to allow specific colors of light to be emitted by each pixel. For example, in embodiments where the LCD 32 is a color display, each pixel of a group of pixels may correspond to a different primary color. For example, in one embodiment, a group of pixels may include a red pixel, a green pixel, and a blue pixel, each associated with an appropriately colored filter. The intensity of light allowed to pass through each pixel (by modulation of the corresponding liquid crystals), and its combination with the light emitted from other adjacent pixels, determines what color(s) are perceived by a user viewing the display. As the viewable colors are formed from individual color components (e.g., red, green, and blue) provided by the colored pixels, the colored pixels may also be referred to as unit pixels.

Figure 4:
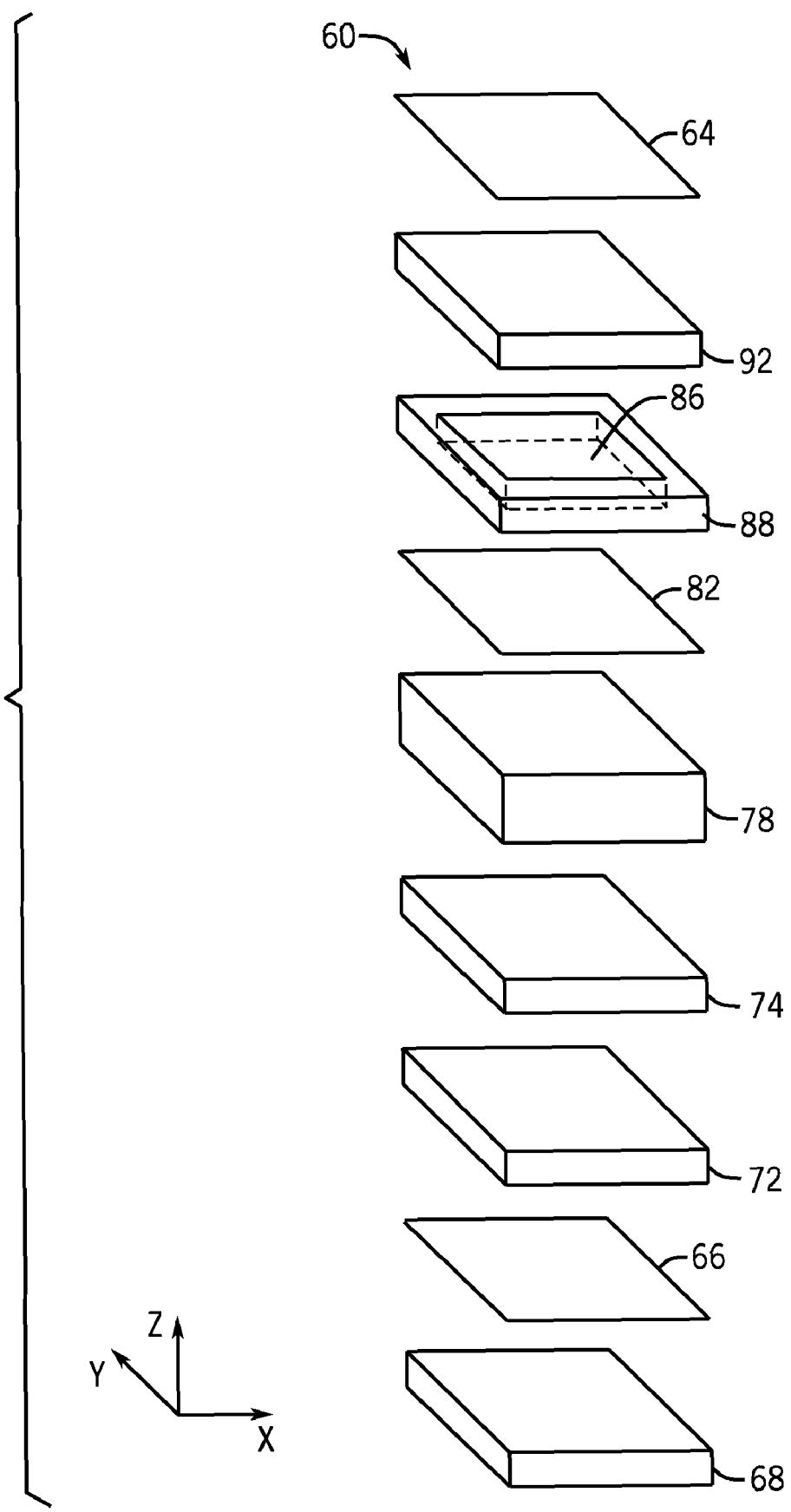
FIG. 4 is an exploded view of exemplary layers of a pixel of an LCD panel, in accordance with aspects of the present disclosure.

With the foregoing in mind, and turning once again to the figures, FIG. 4 depicts an exploded view of different layers of a pixel of an LCD 32. The pixel 60 includes an upper polarizing layer 64 and a lower polarizing layer 66 that polarize light emitted by a backlight assembly 68 or light-reflective surface. A lower substrate 72 is disposed above the polarizing layer 66 and is generally formed from a light-transparent material, such as glass, quartz, and/or plastic.

A thin film transistor (TFT) layer 74 is depicted as being disposed above the lower substrate 72. For simplicity, the TFT layer 74 is depicted as a generalized structure in FIG. 4. In practice, the TFT layer may itself comprise various conductive, non-conductive, and semiconductive layers and structures which generally form the electrical devices and pathways which drive operation of the pixel 60. For example, in an embodiment in which the pixel 60 is part of an FFS LCD panel, the TFT layer 74 may include the respective data lines, scanning or gate lines, pixel electrodes, and common electrodes (as well as other conductive traces and structures) of the pixel 60. Such conductive structures may, in light-transmissive portions of the pixel, be formed using transparent conductive materials, such as indium tin oxide (ITO). In addition, the TFT layer 74 may include insulating layers (such as a gate insulating film) formed from suitable transparent materials (such as silicon oxide) and semiconductive layers formed from suitable semiconductor materials (such as amorphous silicon). In general, the respective conductive structures and traces, insulating structures, and semiconductor structures may be suitably disposed to form the respective pixel and common electrodes, a TFT, and the respective data and scanning lines used to operate the pixel 60, as described in further detail below with regard to FIG. 5. The TFT layer 74 may also include an alignment layer (formed from polyimide or other suitable materials) at the interface with the liquid crystal layer 78.

The liquid crystal layer 78 includes liquid crystal particles or molecules suspended in a fluid or gel matrix. The liquid crystal particles may be oriented or aligned with respect to an electrical field generated by the TFT layer 74. The orientation of the liquid crystal particles in the liquid crystal layer 78 determines the amount of light transmission through the pixel 60. Thus, by modulation of the electrical field applied to the liquid crystal layer 78, the amount of light transmitted though the pixel 60 may be correspondingly modulated.

Disposed on the other side of the liquid crystal layer 78 from the TFT layer 74 may be one or more alignment and/or overcoating layers 82 interfacing between the liquid crystal layer 78 and an overlying color filter 86. The color filter 86, in certain embodiments, may be a red, green, or blue filter, such that each pixel 60 corresponds to a primary color when light is transmitted from the backlight assembly 68 through the liquid crystal layer 78 and the color filter 86.

The color filter 86 may be surrounded by a light-opaque mask or matrix, e.g., a black mask 88 which circumscribes the light-transmissive portion of the pixel 60. For example, in certain embodiments, the black mask 88 may be sized and shaped to define a light-transmissive aperture over the liquid crystal layer 78 and around the color filter 86 and to cover or mask portions of the pixel 60 that do not transmit light, such as the scanning line and data line driving circuitry, the TFT, and the periphery of the pixel 60. In the depicted embodiment, an upper substrate 92 may be disposed between the black mask 88 and color filter 86 and the polarizing layer 64. In such an embodiment, the upper substrate may be formed from light-transmissive glass, quartz, and/or plastic.

Figure 5:
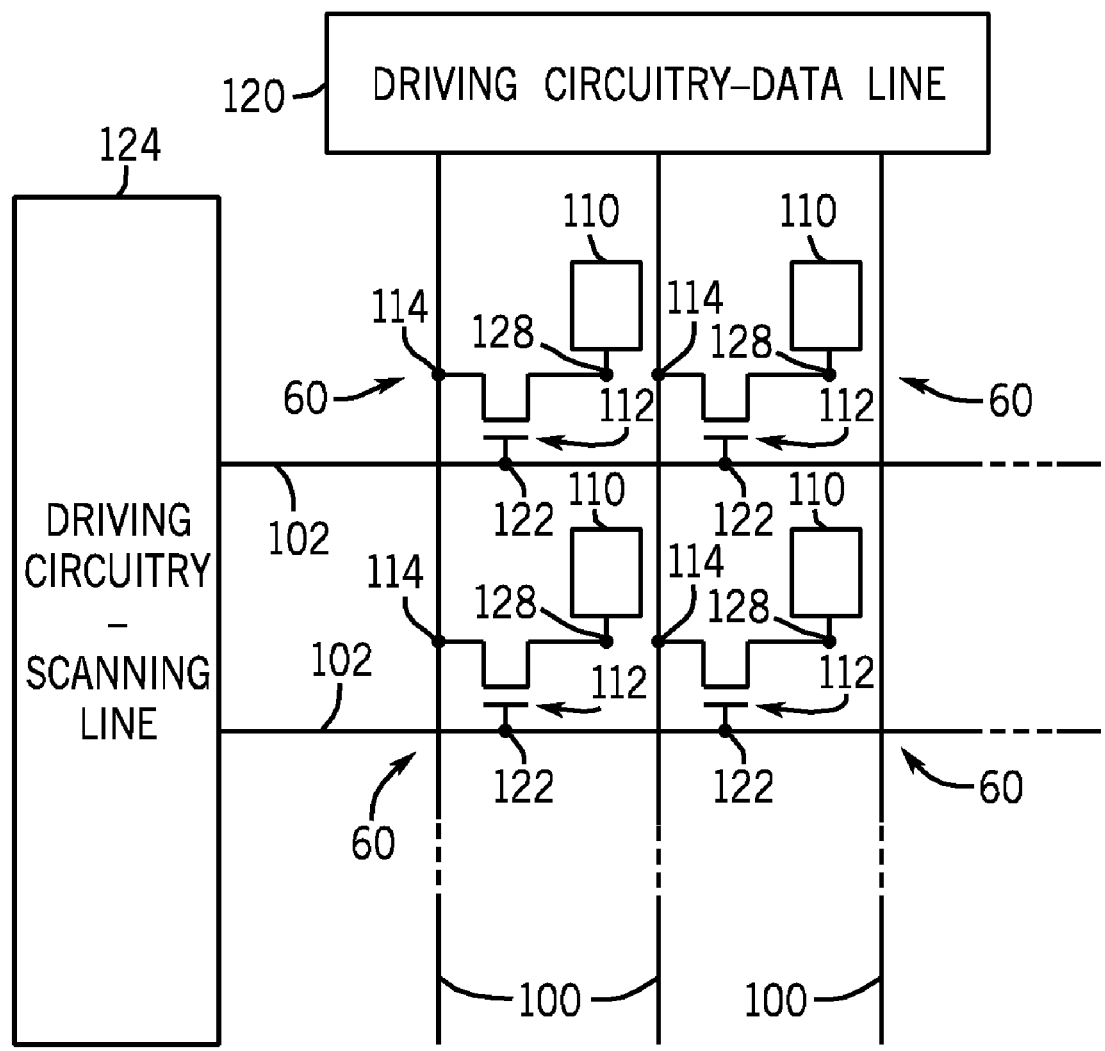
FIG. 5 is a circuit diagram of switching and display circuitry of LCD pixels, in accordance with aspects of the present disclosure.

Referring now to FIG. 5, an example of a circuit view of pixel driving circuitry found in an LCD 32 is provided. For example, such circuitry as depicted in FIG. 5 may be embodied in the TFT layer 74 described with respect to FIG. 4. As depicted, the pixels 60 may be disposed in a matrix that forms an image display region of an LCD 32. In such a matrix, each pixel 60 may be defined by the intersection of data lines 100 and scanning or gate lines 102.

Each pixel 60 includes a pixel electrode 110 and thin film transistor (TFT) 112 for switching the pixel electrode 110. In the depicted embodiment, the source 114 of each TFT 112 is electrically connected to a data line 100, extending from respective data line driving circuitry 120. Similarly, in the depicted embodiment, the gate 122 of each TFT 112 is electrically connected to a scanning or gate line 102, extending from respective scanning line driving circuitry 124. In the depicted embodiment, the pixel electrode 110 is electrically connected to a drain 128 of the respective TFT 112.

In one embodiment, the data line driving circuitry 120 sends image signals to the pixels via the respective data lines 100. Such image signals may be applied by line-sequence, i.e., the data lines 100 may be sequentially activated during operation. The scanning lines 102 may apply scanning signals from the scanning line driving circuitry 124 to the gate 122 of each TFT 112 to which the respective scanning lines 102 connect. Such scanning signals may be applied by line-sequence with a predetermined timing and/or in a pulsed manner.

Each TFT 112 serves as a switching element which may be activated and deactivated (i.e., turned on and off) for a predetermined period based on the respective presence or absence of a scanning signal at the gate 122 of the TFT 112. When activated, a TFT 112 may store the image signals received via a respective data line 100 as a charge in the pixel electrode 110 with a predetermined timing.

The image signals stored at the pixel electrode 110 may be used to generate an electrical field between the respective pixel electrode 110 and a common electrode. Such an electrical field may align liquid crystals within the liquid crystal layer 78 (FIG. 4) to modulate light transmission through the liquid crystal layer 78. In some embodiments, a storage capacitor may also be provided in parallel to the liquid crystal capacitor formed between the pixel electrode 110 and the common electrode to prevent leakage of the stored image signal at the pixel electrode 110. For example, such a storage capacitor may be provided between the drain 128 of the respective TFT 112 and a separate capacitor line.

Figure 6:
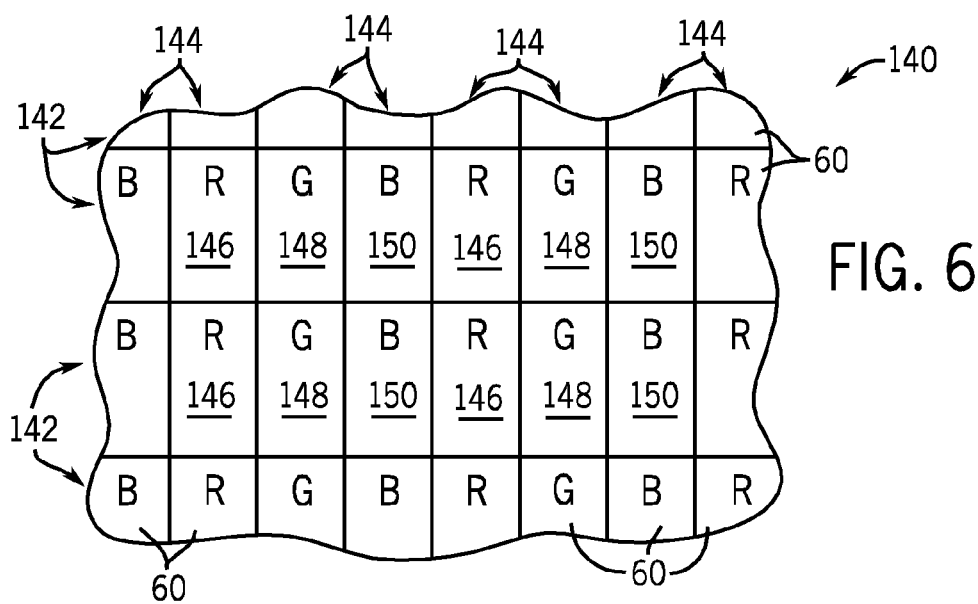
FIG. 6 is a general representation of a portion of an LCD pixel array in accordance with aspects of the present disclosure.

As depicted in FIG. 6, an LCD pixel array 140 may include a plurality of pixels 60 arranged in rows 142 and columns 144. In the presently illustrated embodiment, the array 140 includes alternating columns of red pixels 146, green pixels 148, and blue pixels 150. It is noted, however, that these various colored pixels may be provided in other arrangements, such as those in which the order of columns associated with respective colors is different, or in which the columns include pixels 60 of different colors. Additionally, the pixels 60 may include other colors in addition to, or in place of, those noted above.

Figure 7:
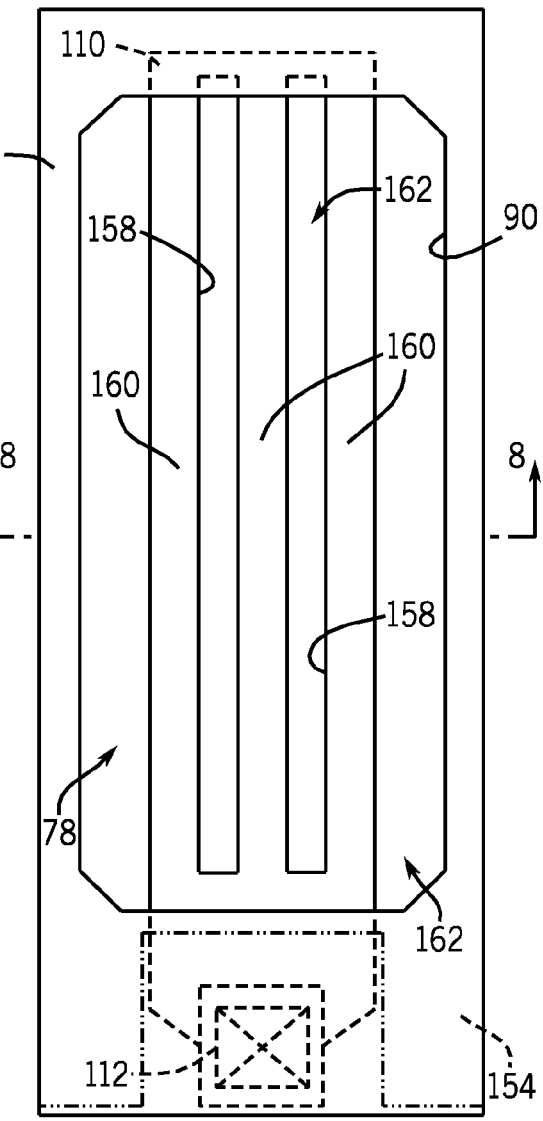
FIG. 7 is a plan view of a single pixel of the LCD pixel array of FIG. 6 in accordance with aspects of the present disclosure.
Figure 8:
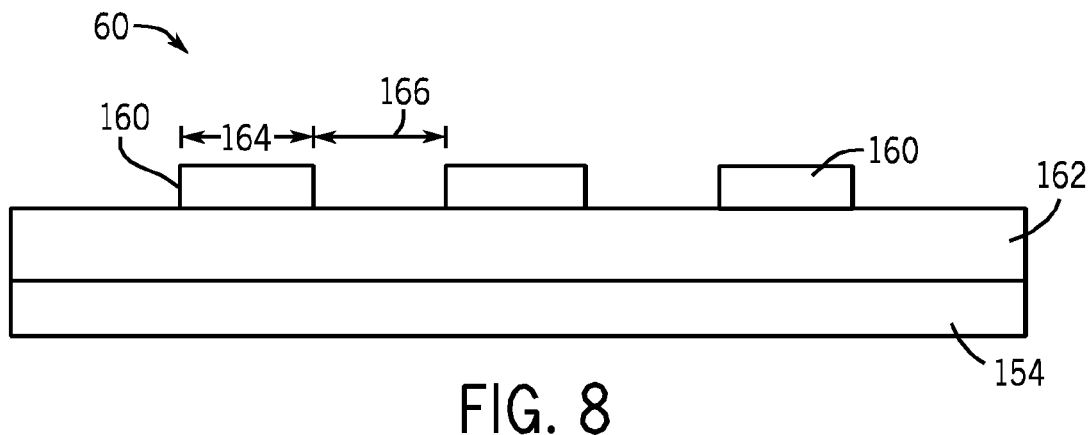
FIG. 8 is a partial cross-section of the pixel of FIG. 7, depicting an electrode arrangement of the pixel in accordance with aspects of the present disclosure.

An exemplary pixel 60 of the array 140 is depicted in the partial plan and cross-sectional views of FIGS. 7 and 8 in accordance with one embodiment. Although the pixel 60 is presently illustrated as a pixel of a fringe field switching (FFS) LCD panel, other display technologies may be used in full accordance with the presently disclosed techniques. In the presently illustrated embodiment, the pixel 60 includes a black mask 88 defining an aperture 90 through which light may pass. As will be appreciated from the discussion above with respect to FIG. 4, a liquid crystal layer 78 may include molecules whose orientation may be controlled through the application of an electric field to thereby control the amount of light allowed to pass from the pixel 60.

To implement such control, the pixel 60 may include various conductive structures configured to apply an electric field to the liquid crystal layer 78. In one embodiment, these conductive structures may include a pixel electrode 110, a transistor 112, and a common electrode 154. The pixel electrode 110 may include a number of elongated extensions or portions 160, also referred to herein as "fingers", which are separated from one another by one or more openings in the electrode, such as slits 158. Although only portions of a single pixel are illustrated in FIGS. 7 and 8, it is noted that the common electrode 154 may be a continuous electrode that spans a number of pixels 60, such as multiple pixels along a common row 142 of the array 140.

The pixel electrode 110 and the common electrode 154 may be formed on opposite sides of a passivation layer 162 that electrically isolates these two electrodes from one another. In the present embodiment, the pixel electrode 110 is formed on an upper surface of the passivation layer 162, and the common electrode 154 is formed on a lower surface of the passivation layer 162. In other embodiments, however, these relative positions may be reversed. Further, in some embodiments the pixel electrode 110 may include a generally continuous electrode disposed within a single pixel 60, while the common electrode 154 may instead include the slits 158 and the elongated portions 160 described herein.

In one embodiment, each of the elongated portions or fingers 160 may have a width 164, and the fingers 160 may be separated from one another by a distance 166 (i.e., the width of the slits 158). In other embodiments, the fingers 160 may have different widths, and may be spaced apart from one another by different distances. Also, while the embodiment of FIGS. 7 and 8 is illustrated as having generally parallel and rectangular slits 158 and elongated portions 160, it is noted that other embodiments may include numerous other shapes, sizes, contours, configurations, and the like. Indeed, as discussed below with respect to FIGS. 10-13, these and other characteristics of the slits 158, the elongated portions 160, and other aspects of the pixels 60 may differ from pixel to pixel. Moreover, the features of the slits 158 and elongated portions 160 may differ even within a single pixel 60.

Figure 9:
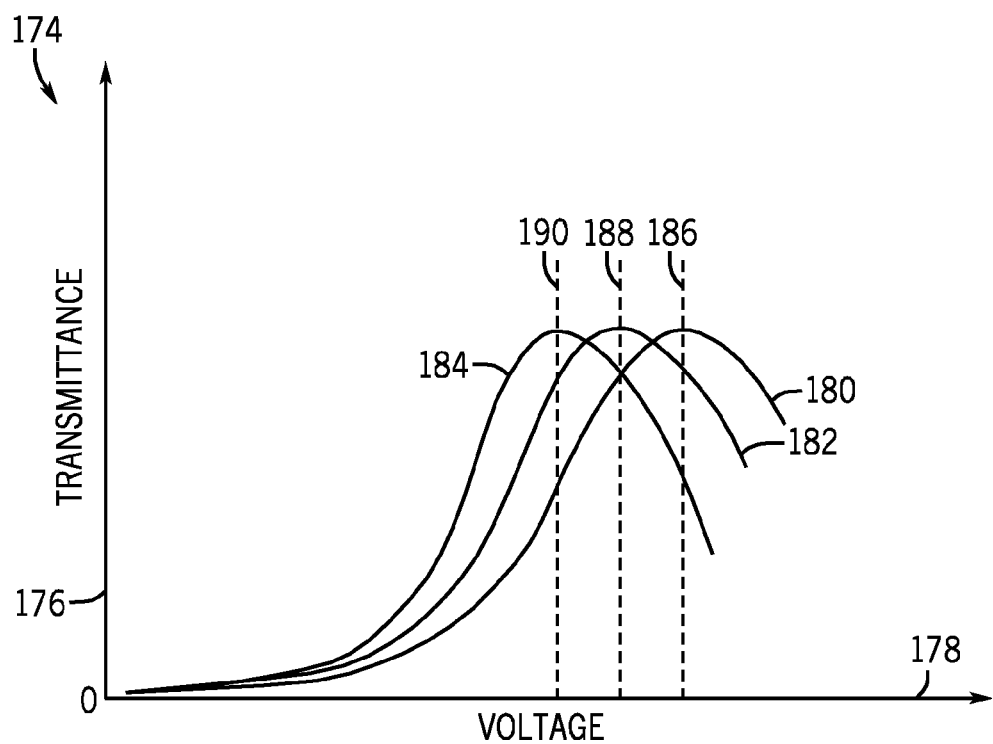
FIG. 9 is a graph of the different transmittance responses of different colors of pixels in one embodiment in accordance with aspects of the present disclosure.

The transmittance of a pixel 60 varies in response to a driving voltage applied to the pixel 60, and also varies depending on the wavelength (or color) of light that the pixel 60 is configured to output. In FIG. 9, a graph 174 generally depicting transmittance-voltage response curves for a plurality of pixels having different colors is provided in accordance with one embodiment. In the graph 174, the transmittance level of pixels 60 are generally represented along the vertical axis 176 as a function of voltage, generally corresponding to the horizontal axis 178. Curve 180 generally represents the manner in which the transmittance of a red pixel 146 may vary as a function of driving voltage, while curves 182 and 184 may generally represent the transmittance of green pixels 148 and blue pixels 150, respectively, as functions of an applied voltage.

As indicated in the graph 174, for each of the red pixels 146, green pixels 148, and blue pixels 150, the transmittance of these pixels 60 increases as the driving voltage is increased to a certain threshold, and then decreases as the driving voltage is further increased beyond this threshold. While each of the curves 180, 182, and 184 may have a similar contour, it may be observed that, for pixels 60 that are substantially uniform except for their color, pixels 60 of one color may not reach maximum transmittance at the same driving voltage as those of another color.

For example, as generally illustrated, red pixels 146 may achieve maximum transmittance at a driving voltage threshold 186, while green pixels 148 and blue pixels 150 may reach peak transmittance at successively lower voltage thresholds 188 and 190, respectively. As the colors perceived by a user from an LCD display are generated through combinations of the colors emitted by the pixels 60 (and, more particularly, by the red pixels 146, green pixels 148, and blue pixels 150 in some embodiments), these color-based transmittance differences may negatively impact gamma and color-neutrality of an LCD panel. To overcome the differences in transmittance-voltage response of the different-colored pixels 60, it is possible to independently drive the red pixels 146, green pixels 148, and blue pixels 150 (i.e., applying three different voltages to pixels of the respective colors) to simulate uniform response. As will be appreciated, however, such a solution requires three different sets of voltage generators in the LCD, generally increasing the manufacturing costs and complexity of the panel.

As discussed below in greater detail with respect to FIGS. 10-13, the size and shape of the red pixels 146, green pixels 148, and blue pixels 150, or of components thereof, may be configured to be physically different than one another to vary the transmittance properties of these pixels. In at least some embodiments, these configurations may result in the transmittance-voltage curve for one color of pixel to more closely approximate that of another color of pixel. More particularly, in some embodiments, the transmittance-voltage response may be substantially identical for all of the pixels 60 within an array 140.

Figure 10:
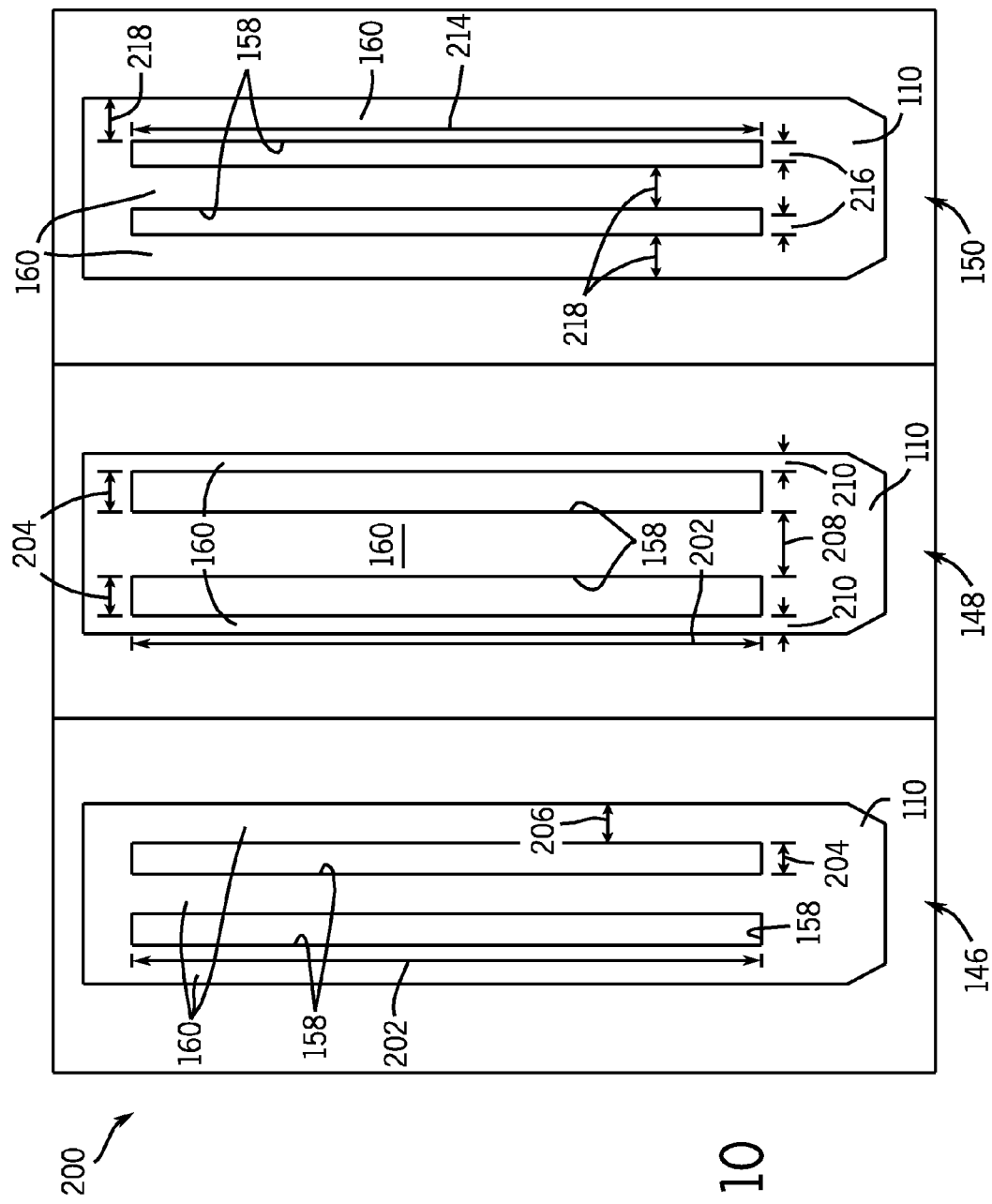
FIG. 10 is a plan view of a group of pixels having different colors, in which the dimensions of elongated finger portions and slits differ between the pixels in accordance with aspects of the present disclosure.

Turning now to FIG. 10, a group 200 of pixels having slits 158 and elongated portions 160 of different widths and lengths is depicted in accordance with one embodiment. For explanatory purposes, only certain elements of the pixel electrodes 110 have been illustrated in FIGS. 10-12, though it will be appreciated that the various pixels depicted would also include a number of other elements, such as those described in greater detail above. The group 200 of pixels may include, for example, a red pixel 146, a green pixel 148, and a blue pixel 150. Each of these pixels may include a pixel electrode 110 having slits 158 and elongated portions 160 as generally discussed above. In this embodiment, the pixel electrode 110 of the red pixel 146 may include slits 158 and elongated portions or fingers 160 having identical lengths 202, while these slits 158 and fingers 160 may themselves have identical widths 204 and 206, respectively.

The green pixel 148, however, may include a pixel electrode 110 having finger portions 160 that vary in width from those of the other pixels, from themselves, or both. Particularly, in the presently illustrated embodiment, the green pixel 148 includes a central finger portion 160 having a width 208 and two outer finger portions 160 each having a width 210 that is less than the width 208. In one embodiment, the width 208 may be greater than, and the width 210 may be less than, the width 206 of the finger portions 160 of the red pixel 146. The slits 158 of the pixel electrode 110 of the green pixel 148 may have lengths 202 and widths 204 similar to those of the red pixel 146, although other configurations are also envisaged.

The blue pixel 150, in turn, includes slits 158 (and, accordingly, finger portions 160) having a length 214 less than the length 202 of the slits 158 in the red and green pixels 146 and 148. The slits 158 of the blue pixel 150 may also be narrower, having widths 216 less than those of the slits 158 of the other illustrated pixels. The finger portions 160 of the blue pixel 150 may also have a uniform width 218. It is noted, however, that the widths of the finger portions 160, the slits 158, or both, in any of the colored pixels may vary in a manner different than that illustrated in FIG. 10 in full accordance with the present techniques.

Figure 11:
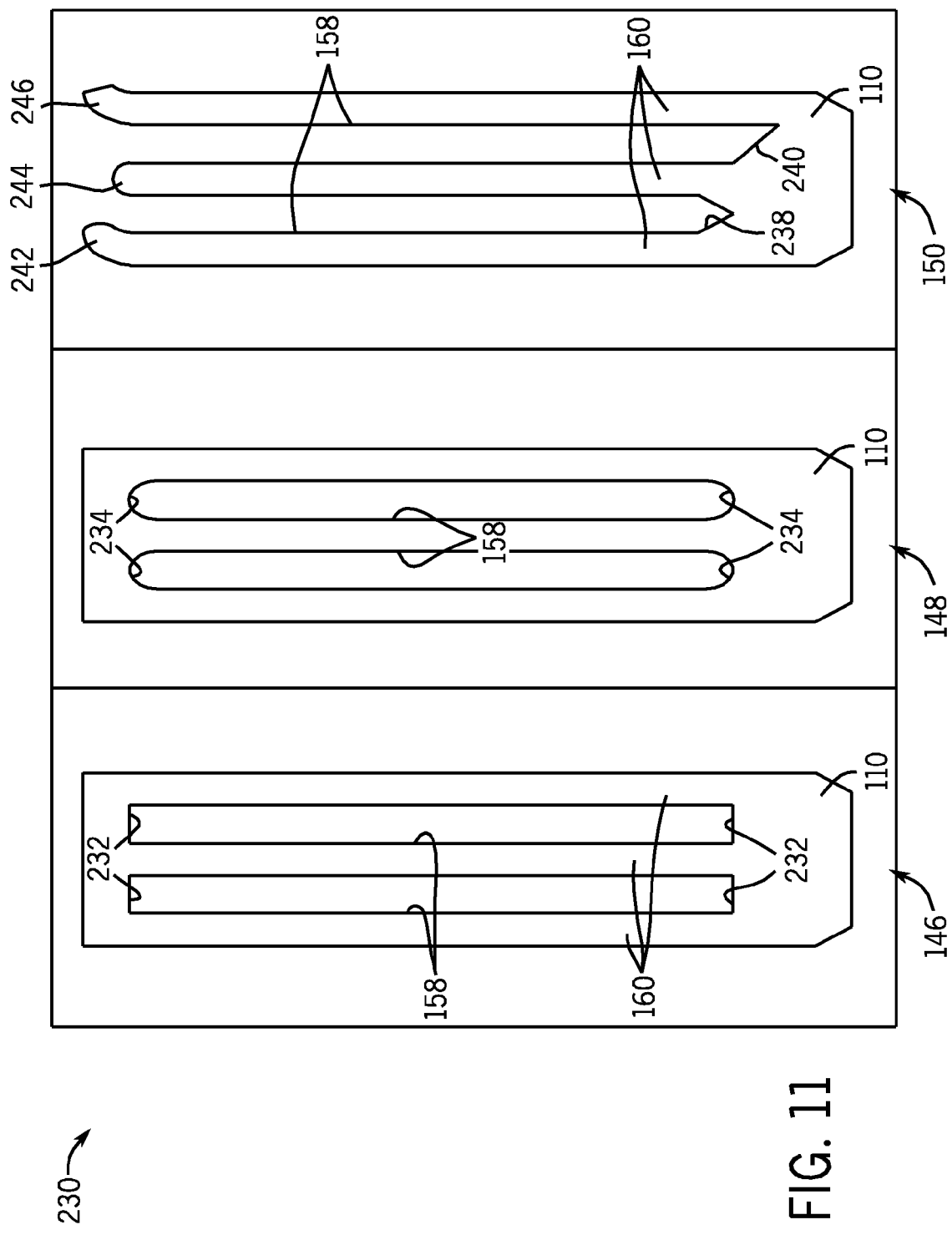
FIG. 11 is a plan view of a group of pixels having different colors, in which the contours of the electrodes differ between the pixels in accordance with aspects of the present disclosure.

As generally depicted in FIG. 11 in accordance with another embodiment, the shapes or contours of the electrodes 110 or other components of a group 230 of pixels may also, or instead, be varied. In the presently illustrated embodiment, the slits 158 of the red pixel 146 may be generally rectangular with end portions 232. In this configuration, each of the elongated portions 160 may also be substantially rectangular.

The green pixel 148 and the blue pixel 150 may have slits 158 and elongated portions 160 shaped different than those of the red pixel 146. For example, the slits 158 of the green pixel 148 may instead have rounded end portions 234, resulting also in differences between the respective elongated portions 160 of the red and green pixels 146 and 148. Still further, the blue pixel 150 may, for example, include slits 158 having irregularly shaped end portions 238 and 240, and fingers 160 that terminate in irregularly shaped end portions 242, 244, and 246, respectively. While certain shapes and profiles of the electrodes 110 and portions thereof have been depicted in FIG. 11, it is noted the present techniques are not limited to any particular shape or configuration. Rather, any suitable shape or profile may be employed. For instance, in some embodiments, the slots 158 and elongated portions 160 of one or more colors of pixels 60 may be generally linear, while those of another color may include undulations or have other non-linear features.

Figure 12:
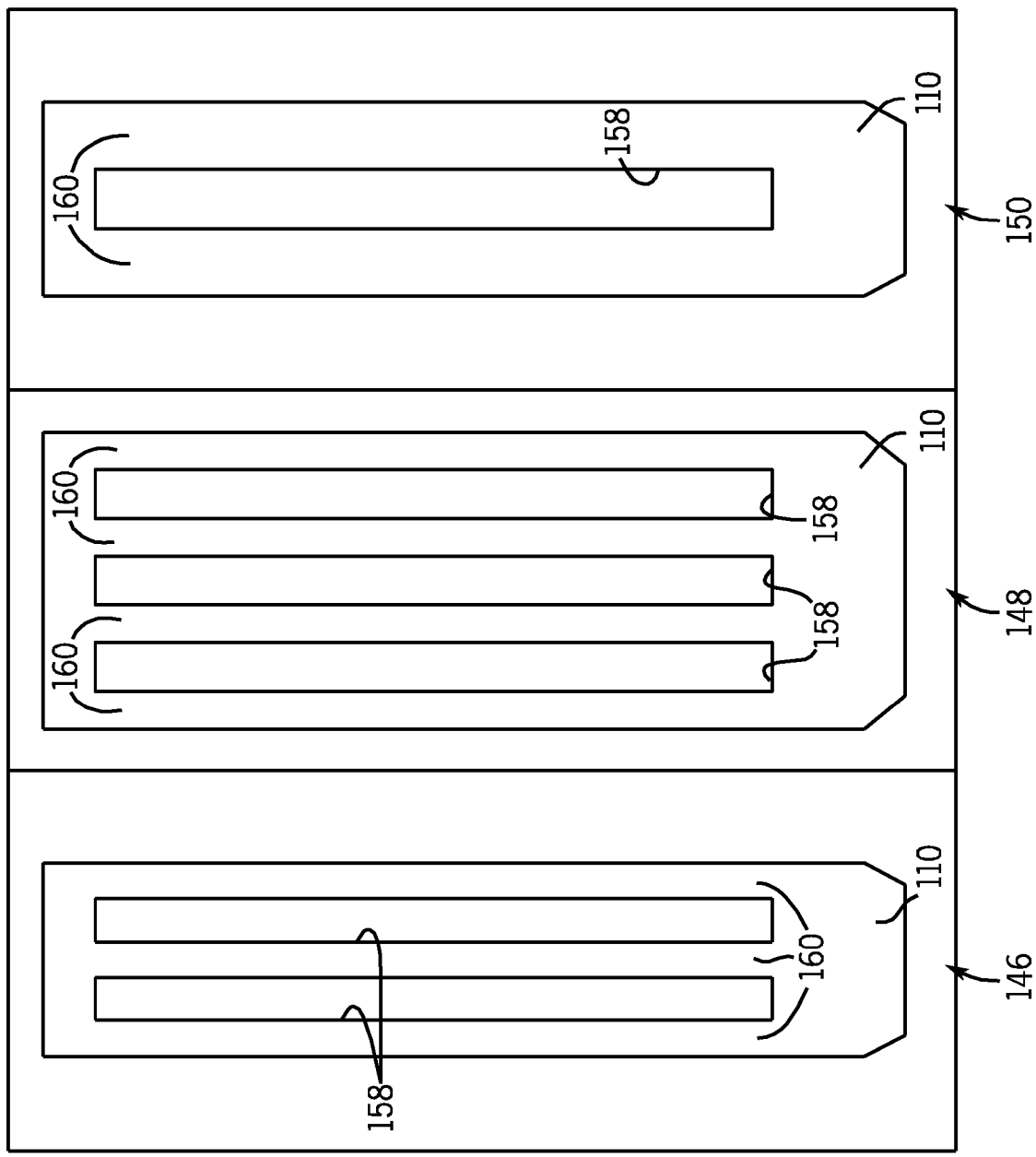
FIG. 12 depicts pixels having different numbers of fingers and slits in accordance with aspects of the present disclosure.

In another embodiment generally depicted in FIG. 12, a group 250 of pixels 60 may include electrodes 110 having different numbers of slits 158 or elongated portions 160. For instance, a red pixel 146 may include a pixel electrode 110 having two slits 158 that define three elongated portions or fingers 160. Further, the green pixel 148 may include a pixel electrode 110 having three slits 158 that generally define four elongated portions 160, and the blue pixel 150 may have a single slit 158 that generally defines two finger portions 160. In some embodiments, the total widths of the electrodes 110 may vary between the various pixels to accommodate a greater or lesser number of slits 158 and elongated portions 160, although such variation in the number of such features may also or instead be accommodated by varying the widths of the slits 158 or elongated portions 160. Additionally, although the pixels of group 250 are depicted as having between one and three slits 159, and between two and four elongated portions 160, any other number of such features may also be used in accordance with other embodiments.

Figure 13:
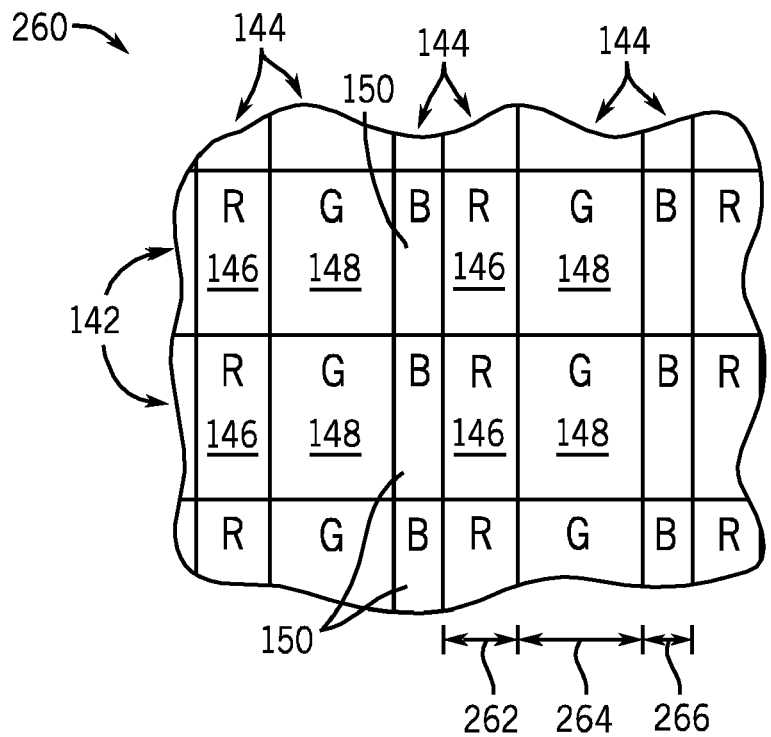
FIG. 13 illustrates a portion of a pixel array in which pixels are sized differently according to color in accordance with aspects of the present disclosure.

Still further, altering the sizes of the pixels 60 themselves may also result in variation of the transmittance-voltage response of the pixels 60. For instance, as generally depicted in FIG. 13, red pixels 146, green pixels 148, and blue pixels 150 may vary in relative size from one another. Particularly, in some embodiments, each column 144 of a pixel array 260 may be formed of a plurality of pixels having a uniform color. In the presently illustrated embodiment, the columns 144 include alternating columns of red pixels 146, green pixels 148, and blue pixels 150, such that each row 142 of pixels includes a repeating pattern of colors. In one embodiment, red pixels 146 (and their respective columns 144) may have a width 262. Green pixels 148, in turn, may have a width 264 that may be greater than (as presently illustrated in FIG. 13), equal to, or less than, the width 262. Further, blue pixels 150 may have a width 266 that differs from either or both of the widths 262 and 264. By controlling the size of the red, green, and blue pixels 146, 148, and 150, respectively, the transmittance-voltage response of each of the pixels may be modified.

Figure 14:
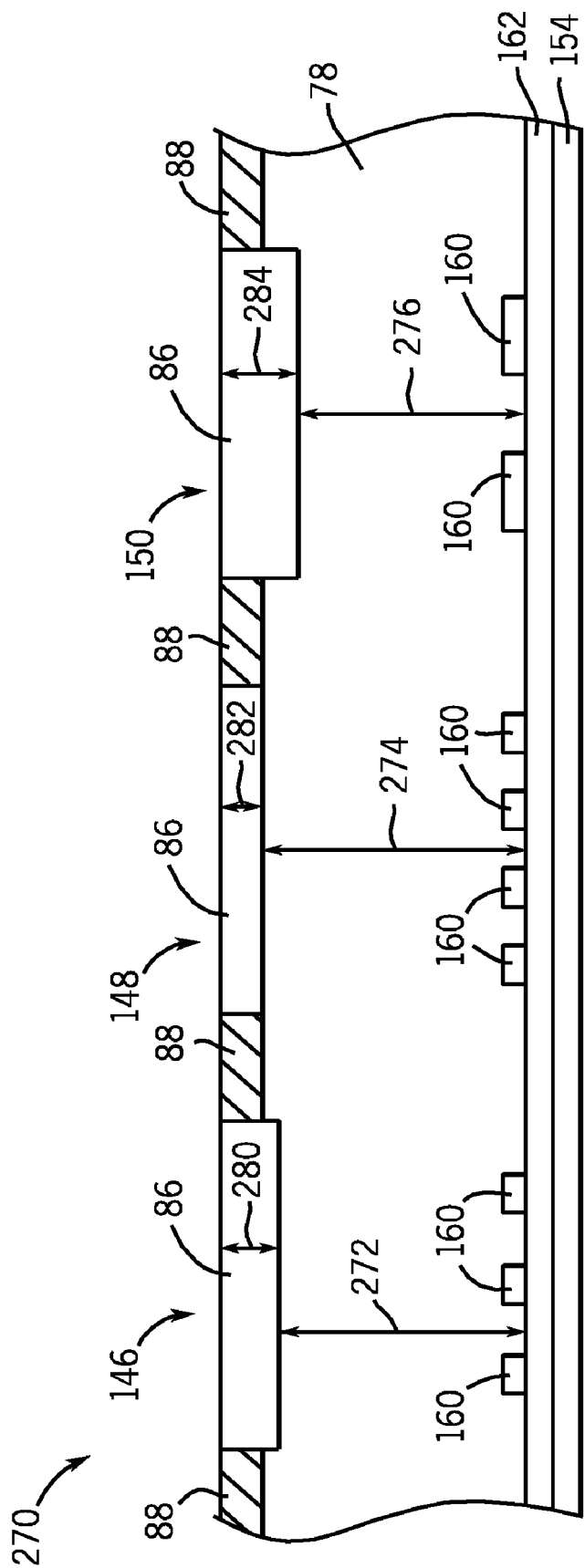
FIG. 14 is a partial cross-sectional view of a group of pixels of different colors, in which the pixels have differing cell gaps in accordance with aspects of the present disclosure.

Additionally, the transmittance-voltage response of the pixels 60 may also be varied by modifying the width of the cell gaps of such pixels, as generally depicted in accordance with one embodiment in FIG. 14. It is noted that the cell gap of a pixel is the distance across the space in which liquid crystal material may be received between upper and lower panel assemblies. Further, the transmittance-voltage response characteristics of a pixel may be a function of its cell gap.

In the presently illustrated embodiment, a group of pixels 270 may include a red pixel 146, a green pixel 148, and a blue pixel 150 that have different cell gaps 272, 274, and 276, respectively. The cell gaps of these pixels (and of other pixels within a pixel array) may be varied in any suitable manner, such as by forming respective color filters 86 with different thicknesses. For example, as generally depicted, red pixels 146 may include red color filters 86 having a width 280, while green and blue pixels 148 and 150 may respectively include green and blue color filters 86 having widths 282 and 284. In some embodiments, one or more of the widths 280, 282, and 284 may vary from the others, such that the corresponding cell gaps of the pixels also vary.

By way of further example, liquid crystal may have higher birefringence for some colors of light (e.g., blue) than for others (e.g., red and green). In one embodiment, the cell gap 276 of blue pixels 150 may be formed narrower than that of cell gaps 272 and 274 of red and green pixels 146 and 148 such that the transmittance-voltage response of the blue pixels 150 more closely approximate those of the different-colored pixels. Moreover, in one embodiment, the cell gaps of all of the colored pixels may be formed differently in accordance with their associated colors such that all of the pixels have a similar transmittance-voltage response.

Figure 15:
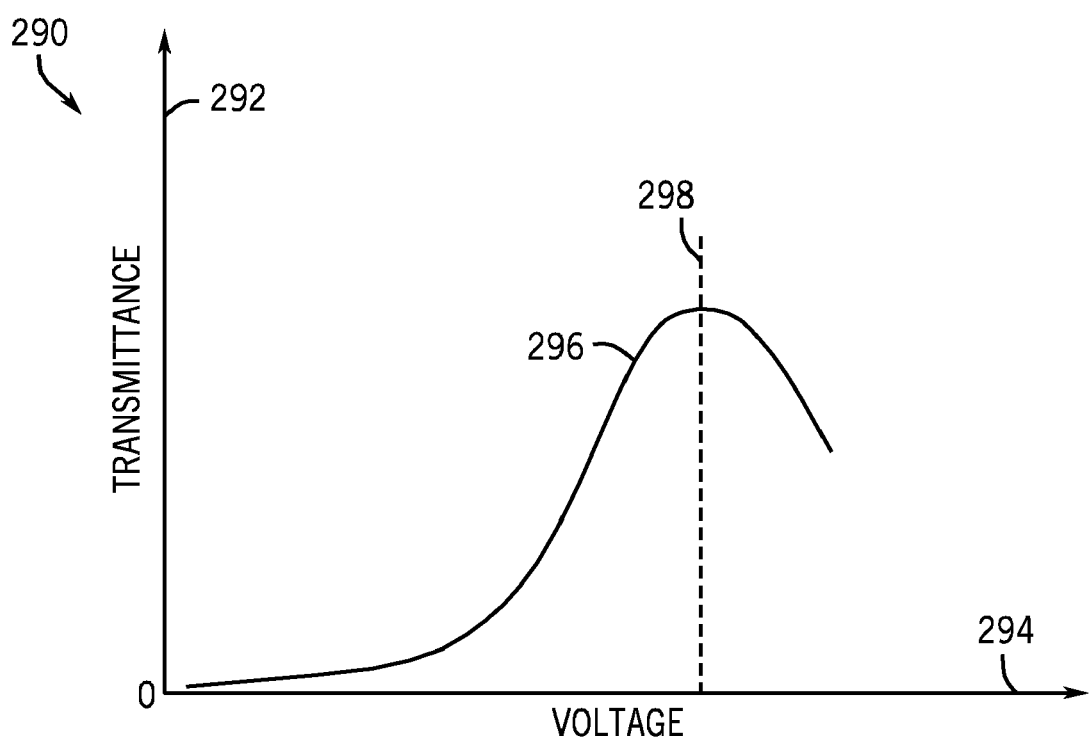
FIG. 15 is a graph depicting a universal transmittance response curve for pixels of different colors in accordance with aspects of the present disclosure.

In one embodiment, the transmittance-voltage response of each of the various colored pixels may be substantially identical, as generally represented in FIG. 15. In this depiction, the graph 290 includes vertical and horizontal axes 292 and 294, corresponding to transmittance and voltage, respectively. A curve 296 may represent a substantially uniform transmittance-voltage response of multiple pixels having different colors. In this instance, peak transmittance for multiple, different-colored pixels may be achieved at a single voltage level 298. Such response uniformity may be achieved by varying characteristics of the pixels based on their respective colors, and the varied characteristics may include, but are not limited to, the examples provided above. Additionally, such embodiments including pixels that are physically varied according to color to reduce the differences in transmittance-voltage responses of the different-colored pixels may result in LCD panels having improved white point and color reproduction.

While the preceding examples describe configurations of pixels for use in an FFS LCD device, it should be understood that these examples are not intended to be limiting in scope and, indeed, the present teachings may also be applicable to other types of LCDs or display panels, such as IPS LCDs or others. More generally, while the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A liquid crystal display (LCD) panel comprising:
   a plurality of pixels, each pixel comprising:
   a common electrode formed on an insulating layer;
   a pixel electrode formed on the insulating layer; and
   a liquid crystal layer responsive to electric fields generated by the common and pixel electrodes;
   wherein the plurality of pixels includes at least two sets of pixels that are each configured to emit a different color of light, and wherein the pixel electrodes of the pixels in a first set of the at least two sets of pixels are configured different than the pixel electrodes of the pixels in a second set of the at least two sets of pixels, wherein the plurality of pixels are configured to emit a substantially uniform respective peak transmittance at a common voltage.

2. The LCD panel of claim 1, wherein each of the pixel electrodes includes two or more elongated portions spaced apart from one another.

3. The LCD panel of claim 2, wherein the two or more elongated portions of the pixel electrodes of the pixels in the first set have different widths than the two or more elongated portions of the pixel electrodes in the second set.

4. The LCD panel of claim 2, wherein the two or more elongated portions of the pixel electrodes of the pixels in the first set are spaced at a greater distance apart than the two or more elongated portions of the pixel electrodes in the second set.

5. The LCD panel of claim 1, wherein the at least two sets of pixels include a set of red pixels, a set of green pixels, and a set of blue pixels.

6. The LCD panel of claim 1, wherein the common electrode and the pixel electrode are formed on opposite sides of the insulating layer.

7. An electronic device comprising:
   one or more input structures;
   a storage structure encoding one or more executable routines;
   a processor capable of receiving inputs from the one or more input structures and of executing the one or more executable routines when loaded in a memory; and
   a liquid crystal display (LCD) capable of displaying an output of the processor, wherein the LCD includes a plurality of different-colored pixels, the different-colored pixels each comprising:
   a color filter enabling the pixel to output light having a wavelength associated with a respective color;
   a liquid crystal layer; and
   at least one electrode capable of controlling transmittance of the liquid crystal layer;
   wherein the shape of the at least one electrode of each pixel associated with one color is different than the shape of the at least one electrode of each pixel associated with another color, wherein the shape of the electrodes are configured to provide a substantially uniform transmittance-voltage response of the plurality of different-colored pixels upon application of a common voltage.

8. The electronic device of claim 7, wherein the at least one electrode of each pixel includes an electrode having one or more slits.

9. The electronic device of claim 8, wherein the contours of the one or more slits are different for each pixel associated with one color than for each pixel associated with another color.

10. The electronic device of claim 8, wherein the number of slits varies according to the color associated with the respective pixel.

11. The electronic device of claim 7, wherein the LCD panel includes a fringe field switching LCD panel.

12. A liquid crystal display (LCD) panel comprising:
a plurality of red pixels;
a plurality of green pixels; and
a plurality of blue pixels;
wherein the pluralities of red pixels, green pixels, and blue pixels are configured such that the transmittance response of each of the red, green, and blue pixels, upon application of a common voltage to each of the red, green, and blue pixels, is substantially uniform.

13. The LCD panel of claim 12, wherein the pixels of at least one of the pluralities of red, green, and blue pixels have different sizes than those of another of the pluralities of red, green, and blue pixels.

14. The LCD panel of claim 13, wherein the pixels of each of the pluralities of red, green, and blue pixels have different sizes than those of the other pluralities of red, green, and blue pixels.

15. The LCD panel of claim 12, wherein the pixels of each of the pluralities of red, green, and blue pixels have different cell gaps than those of the other pluralities of red, green, and blue pixels.

16. A liquid crystal display (LCD) panel including a pixel array comprising:
a first column of pixels;
a second column of pixels adjacent the first column of pixels; and
a third column of pixels adjacent the second column of pixels;
wherein each pixel of the first, second, and third columns of pixels includes one or more electrodes configured to control orientation of molecules in a liquid crystal layer, and wherein the one or more electrodes of each pixel of the first, second, and third columns are substantially identical to the one or more electrodes of other pixels in its respective column, but different than the one or more electrodes of the pixels in the other two columns of the first, second, and third columns of pixels, wherein each pixel of the first, second, and third columns of pixels are configured to emit a substantially uniform respective peak transmittance at a common voltage.

17. The LCD panel of claim 16, wherein each of the first, second, and third columns of pixels includes pixels of a single respective color.

18. The LCD panel of claim 16, wherein the one or more electrodes of each pixel in one of the first, second, or third columns differ in at least one of shape or dimensions in comparison to the pixels in the other two columns.

19. An electronic device comprising:
one or more input structures;
a storage structure encoding one or more executable routines;
a processor capable of receiving inputs from the one or more input structures and of executing the one or more executable routines when loaded in a memory; and
a liquid crystal display (LCD) capable of displaying an output of the processor, wherein the LCD includes respective pluralities of red, green, and blue pixels, each pixel comprising:
a liquid crystal material;
first and second electrodes formed on opposite sides of an insulating layer,
wherein the first electrode includes a plurality of finger portions separated from one another by one or more respective slits in the first electrode; and
a transistor configured to control generation of an electric field to vary the orientation of molecules within the liquid crystal layer;
wherein at least one of the finger portions or slits of the pixels within one of the pluralities of red, green, or blue pixels differ in at least one of length or width from those of the pixels of the other pluralities of red, green, or blue pixels, wherein the at least one of the finger portions or slits of the pixels within one of the pluralities of red, green, or blue pixels are configured to provide a substantially uniform transmittance-voltage response of each of the plurality of the pluralities of red, green, and blue pixels upon application of a common voltage.

20. The electronic device of claim 19, wherein at least one of the finger portions or slits of the pixels within one of the pluralities of red, green, or blue pixels differ in shape from those of the pixels of the other pluralities of red, green, or blue pixels.

21. The electronic device of claim 19, wherein the first electrodes of the pixels in one of the pluralities of red, green, or blue pixels have a greater number of finger portions than those of the pixels in another of the pluralities of red, green, or blue pixels.

22. The electronic device of claim 19, wherein at least one of the finger portions or slits of the pixels within each of the pluralities of red, green, or blue pixels differ in at least one of length or width from those of the pixels of the other pluralities of red, green, or blue pixels.

23. A method of manufacturing a liquid crystal display (LCD) panel, the method comprising:
forming a plurality of pixels on a substrate, wherein forming the plurality of pixels comprises:
forming a thin film transistor (TFT) for each pixel; and
forming an electrode in electrical communication with the TFT for each pixel,
wherein the electrodes of some pixels differ in configuration from those of other pixels,
wherein the electrodes are configured to provide a substantially uniform transmittance-voltage response of the plurality of pixels upon application of a common voltage.

24. The method of claim 23, comprising:
coupling the substrate to an additional substrate having a plurality of color filters; and
providing a liquid crystal layer between the substrate and the additional substrate.

25. A liquid crystal display (LCD) panel comprising:
a plurality of pixels including a first set of pixels associated with a first color and a second set of pixels associated with a second color, wherein the pixels of the first set include cell gaps different in magnitude than cell gaps of the pixels of the second set, wherein the cell gaps of the plurality of pixels are configured to provide a substantially uniform transmittance-voltage response of the plurality of pixels upon application of a common voltage.

26. The LCD display of claim 25, wherein the cell gaps of the pixels of the first and second sets are configured to reduce a difference in transmittance-voltage response between the pixels of the first set and the pixels of the second set.

27. The LCD display of claim 25, wherein the plurality of pixels includes a set of red pixels, a set of green pixels, and a set of blue pixels.

* * * * *